United States Patent
Ice, Jr.

[15] 3,692,059
[45] Sept. 19, 1972

[54] TUBE PLUGGING TOOL POSITIONER

[72] Inventor: Charles O. Ice, Jr., Long Beach, Calif.

[73] Assignee: Hydro-Vel Services, Inc., Monahans, Tex.

[22] Filed: June 3, 1970

[21] Appl. No.: 43,159

[52] U.S. Cl. .................... 138/89, 122/364, 220/24.5
[51] Int. Cl. ................................................. F16l 55/10
[58] Field of Search ......... 29/200 P, 200 D, 202, 522; 138/89, 90, 91, 97; 165/76; 220/24.5; 122/364

[56] References Cited

UNITED STATES PATENTS

| | | | |
|---|---|---|---|
| 1,213,060 | 1/1917 | Baker | 138/91 |
| 2,856,963 | 10/1958 | Hoerter | 138/89 |
| 1,647,223 | 11/1927 | Hart | 138/91 |

FOREIGN PATENTS OR APPLICATIONS

| | | | |
|---|---|---|---|
| 1,054,810 | 1/1967 | Great Britain | 138/89 |

*Primary Examiner*—Theron E. Condon
*Assistant Examiner*—Neil Abrams
*Attorney*—Richards, Harris & Hubbard

[57] ABSTRACT

A tube plugging tool positioner includes a body and a locating member mounted on the body. The body is attached to the end of a tube plugging tool for movement therewith through a heat exchanger tube. The locating member is retracted relative to the body during movement of the positioner through a tube, and is extended as the body passes out of the remote end of the tube. The tube plugging tool is then positioned relative to the tube by withdrawing the positioner to the extent permitted by the locating member. The positioner may be either spring or gravity actuated, and is constructed for movement through a heat exchanger tube even though the tube has foreign matter in it or has holes through it.

15 Claims, 6 Drawing Figures

PATENTED SEP 19 1972

3,692,059

INVENTOR:
CHARLES O. ICE, JR.

Richards, Harris & Hubbard
ATTORNEYS 3,692,059

TUBE PLUGGING TOOL POSITIONER

BACKGROUND OF THE INVENTION

Heat exchangers are used throughout industry to transfer heat from one fluid to another. One type of heat exchanger comprises a cylindrical shell that is closed at the ends by front and rear access plates. A tube bundle is disposed within the cylindrical shell, and is comprised of a large number of small diameter, thin wall tubes. The tubes extend between tube sheets which partition the center portion of the shell from the ends thereof. In the operation of such a heat exhanger, one fluid is passed through the tubes from one end of the shell to the other. A second fluid is passed through the central portion of the shell around the tubes to achieve heat transfer between the fluids.

It is usually very important to maintain separation between the fluids passing through a heat exchanger. Since the fluids are often highly corrosive, the tubes of a heat exchanger are prone to develop leaks, which result in the commingling of the fluids passing through the heat exchanger. When this occurs, it is usually economically desirable to plug the ends of the leaking tube and to continue the operation of the heat exchanger, rather than to replace the leaking tube.

In the past, it has been necessary to remove both the front access plate and the rear access plate from a heat exchanger in order to plug the ends of a leaking tube. Such a procedure is undesirable, because the removal of the rear access plate of a heat exchanger is a very difficult and time consuming process. Also, the removal of the rear access plate of a heat exchanger often results in the loss of a considerable amount of fluid from the heat exchanger.

At the present time, it is no longer necessary to remove the rear access plate of a heat exchanger in order to plug a leaking tube in the heat exchanger. Rather, the end of the leaking tube adjacent the rear access plate is plugged by means of a tube plugging tool that is inserted through the tube from the end adjacent the front access plate. Such a tube plugging tool is disclosed in the co-pending application entitled "TUBE PLUGGING TOOL" filed by Walter S. Frazer, Charles O. Ice, Jr. and Lanny G. Ice on Mar. 25, 1970, Ser. No. 22,613.

In the use of the Frazer et al. tube plugging tool, it is important to form a plug in the portion of a leaking tube that is positioned within the tube sheet. This is because if the plug is formed in an unsupported portion of the tube, the tube bulges outwardly. Outward bulging renders subsequent removal of the tube difficult, should such a procedure become necessary or desirable. Also, in the case of an extremely corroded tube, the operation of a tube plugging tool in an unsupported portion of the tube may burst the tube, in which event it may be impossible to adequately plug the tube.

The present invention relates to a tube plugging tool positioner. The use of the invention results in the positioning of a tube plugging tool within the portion of the remote end of a heat exchanger tube that is surrounded by the tube sheet. The invention is disclosed in several embodiments, all of which are adapted to pass through a leaking heat exchanger tube even though the tube has foreign matter in it or has holes through it.

SUMMARY OF THE INVENTION

In accordance with the preferred embodiment of the invention, a tube plugging tool positioner comprises a member mounted on the tapered mandrel of a tube plugging tool for movement therewith through a tube to the remote end thereof and for locating the mandrel at the remote end of the tube. More specifically, the tube plugging tool positioner comprises a body secured to the tapered mandrel and a locating member that is deployed as the body passes through the remote end of the tube. The locating member is preferably engaged with a portion of the heat exchanger located adjacent the remote end of the tube by retracting the tube plugging tool after the deployment of the locating member.

DESCRIPTION OF THE DRAWING

A more complete understanding of the invention may be had by referring to the following Detailed Description when taken in conjunction with the drawing, wherein.

DETAILED DESCRIPTION

Figure 1:
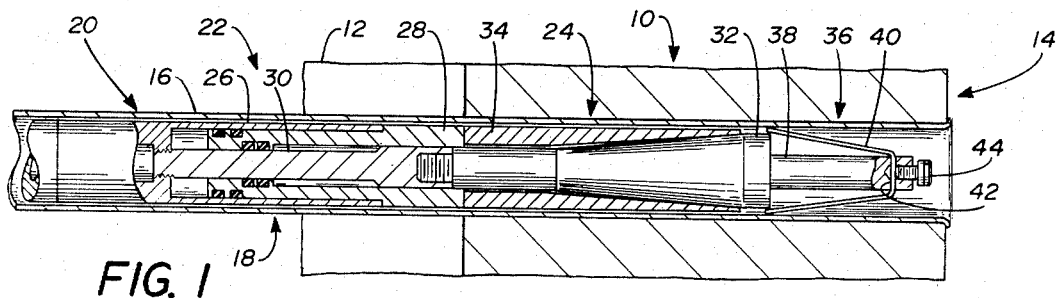
FIGS. 1 and 2 are illustrations of the insertion and the use, respectively, of a first embodiment of the invention.

Referring now to the drawings, a conventional heat exchanger 10 is shown. The heat exchanger 10 includes a cylindrical shell 12, a tube sheet 14 and a tube 16. In actual practice, the cylindrical shell 12 extends between a pair of tube sheets, and the tube sheets support a plurality of tubes, all of which extend through the cylindrical shell from one tube sheet to the other. The heat exchanger 10 further includes front and rear access plates (not shown) located at opposite ends of the cylindrical shell 12.

For the purpose of this description, it will be assumed that the heat exchanger 10 has been in service for some time, and that a leak has developed in the tube 16. Whenever such a leak occurs, it is necessary to remove the leaking tube from service. Usually, this is accomplished by plugging the opposite ends of the leaking tube.

In the past, it has been necessary to remove both of the access plates of a heat exchanger in order to plug the opposite ends of a leaking tube in the heat exchanger. However, it is now possible to plug the end of a leaking heat exchanger tube located remote from the front access plate of a heat exchanger without removing the rear access plate thereof. Preferably, this is accomplished by means of a tool constructed in accordance with the invention disclosed in the co-pending application entitled "TUBE PLUGGING TOOL" filed by Walter S. Frazer, Charles O. Ice, Jr. and Lanny G. Ice on Mar. 25, 1970, Ser. No. 22,613.

Referring now specifically to FIG. 1, a tube plugging tool 18 constructed in accordance with the Frazer et al. invention is shown. The tool 18 includes a lance 20, a hydraulic actuator 22, and a plug 24. The lance 20 is hollow throughout its length and may be comprised of a plurality of interconnected sections. The hydraulic actuator 22 includes an outer cylinder member 26, an inner piston 28, and a stem 30, which is threadably connected to the lance 20.

The plug 24 comprises a tapered mandrel 32 and a sleeve 34. The tapered mandrel 32 is threadably connected to the stem 30 of the hydraulic actuator 22, and is formed from a relatively hard material, such as steel. The sleeve 34 is positioned around the mandrel 32 for actuation by the piston 28 of the hydraulic actuator 22, and is formed from a relatively soft material, such as lead.

In the use of the tube plugging tool 18, the plug 24 is positioned in the portion of the tube 16 located within the tube sheet 14 of the heat exchanger 10. Then, hydraulic fluid is directed to the hydraulic actuator 22 through the hollow core of the lance 20. As the hydraulic fluid enters the hydraulic actuator 22, the piston 28 is forced outwardly, that is, away from the lance 20 and toward the plug 24. The piston 28 slides the sleeve 34 of the plug 24 along the tapered mandrel 32 thereof, whereupon the sleeve 34 is cammed outwardly and into wedging interengagement with the interior of the tube 16. The operation of the hydraulic actuator 22 is continued until the tube 16 is plugged. Then, the lance 20 and the hydraulic actuator 22 are disconnected from the plug 24, and are withdrawn from the tube 16.

The positioning of the plug 24 within the portion of the tube 16 located inside the tube sheet 14 is very important to the successful operation of the tube plugging tool 18. This is because the material of the tube sheet 14 provides the back pressure necessary to assure sufficient wedging interengagement between the sleeve 34 and the tube 16 to plug the tube. Also, if the tool 18 is operated while the plug 24 is located in a portion of the tube 16 that is not surrounded by the tube sheet 14, the tube 16 tends to bulge outwardly as the sleeve 34 is moved relative to the tapered mandrel 32. Outward bulging of the tube 16 is detrimental to the subsequent removal of the tube 16, should such an operation become necessary or desirable. In the case of a tube that has been severely weakened by corrosion, etc., this bulging action can result in a rupture of the tube, in which event it may be impossible to plug the tube.

Figure 2:
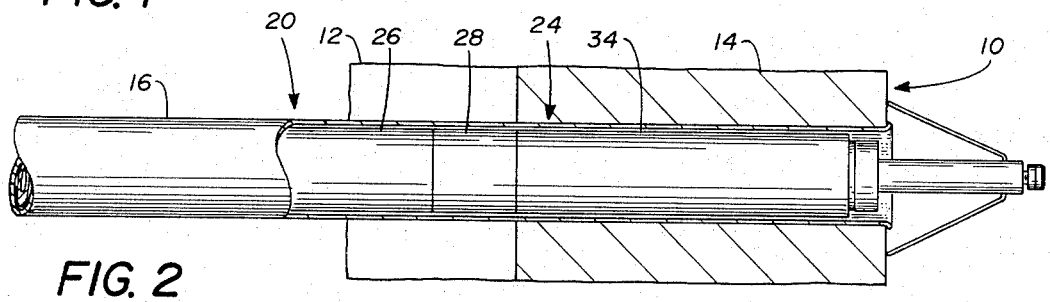

The present invention relates to a system for assuring he proper positioning of a tube plugging tool prior to the operation thereof. A first embodiment of the invention is shown in FIGS. 1 and 2 and comprises a tube plugging tool positioner 36. The positioner 36 includes a stem 38 which is secured to the tapered mandrel 32 of the plug 24, and which may be formed integrally with the tapered mandrel 32 or threadably attached thereto, as desired. The positioner 36 further includes a locating member 40 which preferably comprises a generally V-shaped spring formed from music wire, or the like. The spring 40 is positioned in a bore 42 formed through the stem 38, and is retained in the orientation shown in FIGS. 1 and 2 by a set screw 44.

In use, the positioner 36 is pushed through a leaking tube in a heat exchanger ahead of the plug of a tube plugging tool. As the positioner 36 is inserted into a tube, the spring 40 is cammed into the position shown in FIG. 1. The spring 40 has sufficient resiliency to ride over any foreign matter that may be present in the tube. Also, in the event the spring 40 enters a hole comprising a leak in the tube, it is cammed out of the hole as the tube plugging tool is pushed through the tube.

When the positioner 36 reaches the remote end of the leaking tube, the spring 40 snaps outwardly to the position shown in FIG. 2. Then, the tube plugging tool is pulled out of the tube 16 to the extent permitted by the spring 40 of the positioner 36. The positioner 36 is so constructed that, when the spring 40 is in engagement with the tube sheet of the heat exchanger, the plug 24 of the tool is properly located relative to the leaking tube. Thus, the use of the present invention assures the proper location of a tube plugging tool within a leaking tube.

Occasionally, a leaking tube in a heat exchanger is found to be so fouled with foreign matter that a tube plugging tool of the type shown in FIG. 1 cannot be inserted through it. In such a case, it is necessary to withdraw the tube plugging tool and either plug the tube by other means or replace the tube. The construction of the spring 40 from music wire permits such a withdrawal, in that is permits the bending of the spring 40 upon the application of sufficient force thereto. Thus, should the spring 40 either engage foreign matter in the tube or become lodged in a hole in the tube during withdrawal of the tube plugging tool, a force of sufficient magnitude to bend the spring 40 is imposed on the tool 18, whereupon removal of the tool is permitted.

Figure 3:
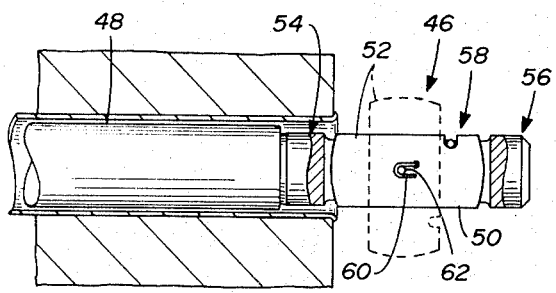
FIG. 3 is an illustration of the second embodiment of the invention.

Referring now to FIG. 3, a tube plugging tool positioner 46 comprising a second embodiment of the invention is shown. The positioner 46 is mounted on the distal end of a tube plugging tool 48 and includes a main body 50 and a locating member 52. The body 50 includes cylindrical end portions 54 and 56 and a slotted center portion 58. The locating member 52 is supported in the slotted center portion 58 of the body 50 for pivotal movement with respect thereto under the action of a torsion spring 60. The movement of the locating member 52 relative to the body 50 is limited by a pin 62.

In the use of the tube plugging tool positioner 46, the locating member 52 is initially pivoted to the position shown in full lines in FIG. 3 against the action of the spring 60. Then, the positioner 46 is pushed through a leaking tube of a heat exchanger ahead of the tube plugging tool 48. When the positioner 46 reaches the end of the leaking tube, the locating member 52 snaps into the position shown in dashed lines in FIG. 3 under the action of the spring 60. Then, the tool 48 is retracted in the leaking tube to the extent permitted by the locating member 52. At this point, the tool 48 is properly positioned relative to the leaking tube.

It will be noted that when the locating member 52 of the tube plugging tool positioner 46 is positioned as shown in full lines in FIG. 3, it has outside dimensions that are slightly smaller than those of the end portion 56 of the positioner. Thus, as the positioner 46 is pushed through a leaking tube, the locating member 52 clears any foreign matter that is cleared by the end portion 56. It will be further noted that in order for the locating member 52 to pivot relative to the main body 50 of the positioner 46, the positioner must encounter openings on both sides of the tube of sufficient size to receive the locating member 52. Thus, it is extremely unlikely that the locating member 52 would move into any hole comprising a leak in a leaking tube of a heat exchanger.

Figure 4:
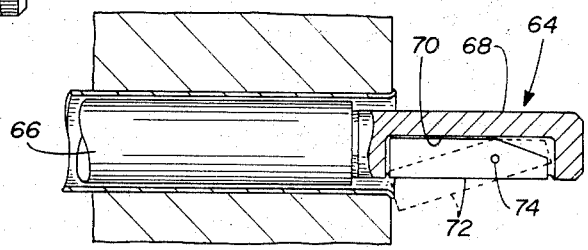
FIG. 4 is an illustration of a third embodiment.

Referring now to FIG. 4, a tube plugging tool positioner 64 comprising a third embodiment of the invention is shown. The positioner 64 is secured to the distal end of a tube plugging tool 66, and includes a main body 68 having a slot 70 formed in it. A locating member 72 is mounted in the slot 70 and is supported for pivotal movement with respect to the body 68 by a shear pin 74.

In use, the locating member 72 of the tube plugging tool positioner 64 is initially positioned as shown in full lines in FIG. 4, and the positioner 64 is moved through a leaking tube in a heat exchanger ahead of the tool 66. When the positioner 64 reaches the end of the leaking tube, the locating member 72 pivots relative to the body 68 under the action of gravity until it reaches the position shown in dashed lines in FIG. 4. Then, the tool 66 is moved in the opposite direction relative to the leaking tube to the extent permitted by the locating member 72. At this point, the tool 66 is properly located relative to the leaking tube.

When the locating member 72 is positioned as shown in full lines in FIG. 4, it is completely contained within the body 68. This facilitates the movement of the positioner 64 through a leaking tube in a heat exchanger, since the locating member 72 clears any foreign matter that is cleared by the body 68. In the event a leaking tube is so clogged with foreign matter that the body 68 cannot be pushed through the tube, the positioner 64 is rotated 180° until the slot 70 extends upwardly. Since the locating member 72 is actuated by gravity, this action eliminates the tendency of the locating member 72 to engage foreign matter in the leaking tube during removal of the positioner 64. Occasionally, the rotation of the positioner 64 is prevented by the engagement of the locating member 72 with a hole in the leaking tube. In the latter case, a force of sufficient magnitude to fracture the shear pin 74 is imposed on the tool 66, whereupon the removal of the positioner 64 is facilitated.

Figure 5:
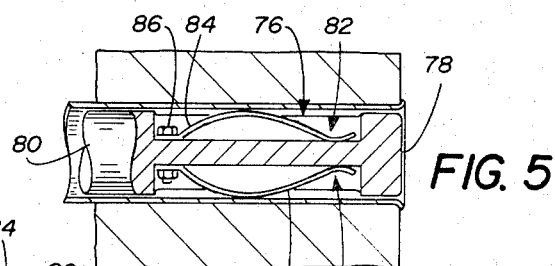
FIGS. 5 and 6 are illustrations of the insertion and the use, respectively, of a fourth embodiment.
Figure 6:
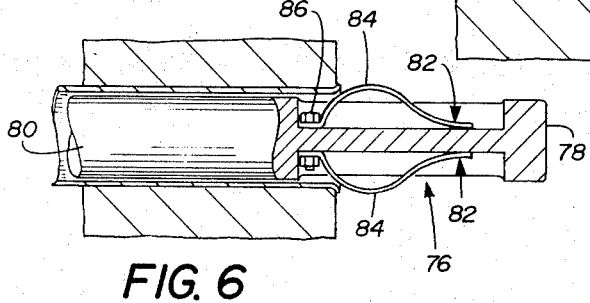

Referring now to FIGS. 5 and 6, a tube plugging tool positioner 76 comprising a fourth embodiment of the invention is shown. The positioner 76 includes a main body 78 which is secured to the distal end of a tube plugging tool 80, and which has a pair of slots 82 formed in it. A pair of leaf spring retaining members 84 are positioned in the slot 82 and are retained in the body 78 of the positioner 76 by a bolt 86.

In the use of the positioner 76, the leaf springs 84 are initially compressed to the position shown in FIG. 5, and the positioner 76 is pushed through a leaking tube in a heat exchanger ahead of the tube plugging tool 80. When the positioner 76 reaches the remote end of the leaking tube, the leaf springs 84 move outwardly to the positions shown in FIG. 6. Then, the tool 80 is withdrawn until the springs 84 engage remote ends of the leaking tube. At this point, the tube 80 is properly positioned relative to the leaking tube.

The leaf springs 84 of the tube plugging tool positioner 76 are preferably constructed from a relatively resilient material. This permits the leaf springs 84 to ride over any foreign matter that may be present within a leaking tube in a heat exchanger. Also, the leaf springs 84 are preferably constructed to provide relatively gradually sloping camming surfaces facing in both directions when the springs 84 are in the compressed state shown in FIG. 5. This permits the positioner 76 to move in either direction through a leaking tube even though one or both of the leaf springs 84 may enter a hole comprising a leak in the tube. It has been found that the gradual slope of the springs 84 does not hinder the sensing of the engagement of the positioner 76 with the remote end of a tube.

From the foregoing, it will be understood that the use of the present invention is advantageous over the prior art in that it assures the proper positioning of the plug of a tube plugging tool within the portion of a leaking heat exchanger tube that is surrounded by the tube sheet. This in turn assures the proper operation of the tube plugging tool to seal the remote end of the leaking tube. Additionally, the various embodiments of the invention illustrated in the drawing are advantageous over the other embodiments.

For example, the tube plugging tool positioner 36 shown in FIGS. 1 and 2 is constructed from a small number of easily manufactured parts. Thus, the positioner 36 is economical to manufacture and use. The use of the tube plugging tool positioner 46 shown in FIG. 3, is advantageous in that the positioner 46 is very positive in operation. Also, the design of the positioner 46 virtually eliminates any possibility of the positioner becoming lodged in a hole in a heat exchanger tube. The tube plugging tool positioner 64 shown in FIG. 4 differs from the remaining embodiments of the invention in that it is actuated solely by gravity. This facilitates the removal of the positioner 64 by rotating the positioner until the slot 70 thereof extends upwardly. Furthermore, the shear pin 74 of the positioner 64 permits removal of the locator even though the locating member 72 becomes lodged. Finally, the use of the tube plugging tool positioner 76 shown in FIGS. 5 and 6 is advantageous in that the leaf springs 84 thereof provide gradually sloping camming surfaces facing in both directions. This facilitates the movement of the positioner 76 in both directions relative to the heat exchanger tube, and virtually eliminates any possibility of lodging the positioner 76 within such a tube.

Although specific embodiments of the invention have been illustrated in the drawings and described herein, it will be understood that the invention is not limited to the embodiments disclosed but is capable of rearrangement, modification and substitution of parts and elements without departing from the spirit of the invention.

What is claimed is:

1. A tube plugging tool positioner comprising a locating member adapted for movement through a tube of a heat exchanger with a tube plugging tool and for engagement with a portion of the heat exchanger at the remote end of the tube to locate the tube plugging tool, said locating member comprising means for permitting movement of the tube plugging tool through the tube notwithstanding the presence of impediments to such movement and means adapting the tube plugging tool for withdrawal from the tube notwithstanding the presence of impediments to such withdrawal, said locating member further comprising a body extending axially from the distal end of the tube plugging tool for movement therewith through the tube and out the remote end of the tube and a member supported on the body for pivotal movement between a position wherein it extends substantially axially of the tube and a position wherein it extends radially outwardly from the body for engagement with the remote end of the tube.

2. A tube plugging tool positioner comprising a locating member adapted for movement through a tube of a heat exchanger with a tube plugging tool and for engagement with a portion of the heat exchanger at the remote end of the tube to locate the tube plugging tool, said locating member comprising means for permitting movement of the tube plugging tool through the tube notwithstanding the presence of impediments to such movement and means adapting the tube plugging tool for withdrawal from the tube notwithstanding the presence of impediments to such withdrawal, said locating member further comprising a body extending axially of the tube plugging tool for movement therewith through the tube and out the remote end thereof and a spring mounted on the body and extending outwardly and rearwardly therefrom to a position normally located further radially outwardly from the body than the wall of the tube so that the locating member moves through the tube with the tube plugging tool even though it engages an impediment to such movement and then snaps outwardly as the body clears the remote end of the tube for engagement with a portion of the heat exchanger to position the tube plugging tool.

3. The tube plugging tool positioner according to claim 2 wherein the locating member comprises a generally V-shaped length of wire extending outwardly and rearwardly from opposite sides of the body and adapted for deformation to permit withdrawal of the tube plugging tool from the tube.

4. The tube plugging tool positioner according to claim 2 wherein the locating member comprises a pair of leaf springs mounted on opposite sides of the body and each extending first outwardly and rearwardly and then inwardly and rearwardly to provide camming surfaces which adapt the tube plugging tool for movement both into the tube and out of the tube even though the leaf springs engage impediments to such movement.

5. The tube plugging tool positioner according to claim 1 wherein the locating member has a length greater than the diameter of the tube, wherein the locating member is supported for pivotal movement about an axis extending perpendicularly to the axis of the tube, and further including spring means connected between the locating member and the body for urging the locating member to rotate relative to the body, and means for preventing further rotation of the locating member when the locating member extends substantially perpendicularly to the axis of the tube.

6. The tube plugging tool positioner according to claim 1 further comprising means supporting the locating member on the body for pivotal movement to a position wherein it extends substantially longitudinally of the tube when the tube plugging tool is rotated to a first orientation and for pivotal movement to a position wherein it projects radially outwardly from the axis of the tube by a distance greater than the radius of the tube when the tube plugging tool is rotated to a second orientation.

7. In combination with a tube plugging tool of the type adapted for movement by an elongate rod through a tube of a heat exchanger to form a plug at the remote end of the tube, apparatus for positioning the tube plugging tool relative to the remote end of the tube comprising:
 a body projecting axially from the distal end of the tube plugging tool for movement therewith through the tube and out the remote end of the tube; and
 a locating member comprising a length of wire mounted on the body and extending outwardly and rearwardly therefrom to a distal end normally located further radially outwardly from the body than the wall of the tube so that the locating member moves through the tube with the tube plugging tool even though it engages an impediment to such movement and snaps outwardly as the body clears the remote end of the tube for engagement with a portion of the heat exhanger to position the tool plugging tool.

8. The tube plugging tool positioning apparatus according to claim 7 wherein the locating member further comprises a generally V-shaped length of wire extending outwardly and rearwardly from opposite sides of the body to distal ends normally separated by a distance which is greater than the diameter of the tube.

9. The tube plugging tool positioning apparatus according to claim 8 wherein the generally V-shaped length of wire is relatively yieldable so that the tube plugging tool is adapted for withdrawal from the tube by deformation of the length of wire.

10. In combination with a tube plugging tool of the type adapted for movement by an elongate rod through a tube of a heat exchanger to form a plug at the remote end of the tube, apparatus for positioning the tube plugging tool relative to the remote end of the tube comprising:
 a body projecting axially from the distal end of the tube plugging tool for movement therewith through the tube and out the remote end of the tube;
 a locating member which is greater in length than the diameter of the tube;
 means supporting the locating member on the body for pivotal movement about an axis extending through the locating member and perpendicularly to the axis of the tube;
 spring means for urging the locating member to rotate relative to the body about the axis; and
 means mounted on the body for preventing further rotation of the locating member under the action of the spring means when the locating member extends substantially perpendicularly to the axis of the tube.

11. In combination with a tube plugging tool of the type adapted for movement by an elongate rod through a tube of a heat exchanger to form a plug at the remote end of the tube, apparatus for positioning the tube plugging tool relative to the remote end of the tube comprising:
 a body projecting axially from the distal end of the tube plugging tool for movement therewith through the tube and out the remote end of the tube;
 a locating member; and means supporting the locating member on the body for pivotal movement to a position wherein it extends substantially axially of the tube when the tube plugging tool is rotated to a first orientation and for pivotal movement to a position wherein it extends radially outwardly from the axis of the tube by a distance greater than the radius of the tube when the tube plugging tool is rotated to a second orientation.

12. The tube plugging tool positioning apparatus according to claim 11 wherein the locating member supporting means comprises a shear pin so that the tube plugging tool is adapted for withdrawal from the tube by fracture of the shear pin.

13. In combination with a tube plugging tool of the type adapted for movement by an elongate rod through a tube of a heat exchanger to form a plug at the remote end of the tube, apparatus for positioning the tube plugging tool relative to the remote end of the tube comprising:
   a body projecting axially from the distal end of the tube plugging tool for movement therewith through the tube and out the remote end of the tube; and
   a locating member comprising a leaf spring mounted on the body and extending rearwardly and outwardly therefrom to a position normally located farther radially outwardly from the body than the wall of the tube so that the locating member moves through the tube with the tube plugging tool even though it engages an impediment to such movement and then snaps outwardly as the body clears the remote end of the tool for engagement with a portion of the heat exchanger to position the tube plugging tool.

14. The tube plugging tool positioning apparatus according to claim 13 wherein the locating member further comprises a second leaf spring mounted on the opposite side of the body from the first leaf spring and extending rearwardly and outwardly from the body to a position normally separated from the corresponding portion of the first leaf spring by a distance in excess of the diameter of the tube.

15. The tube plugging tool positioning apparatus according to claim 14 wherein both leaf springs comprise portions extending rearwardly and inwardly from the separated portions so that the tube plugging tool is adapted for withdrawal from the tube even though the leaf springs engage empediments to such withdrawal.

* * * * *